2,872,426

Patented Feb. 3, 1959

2,872,426

ANTISKINNING COMPOSITIONS CONTAINING UNSYMMETRICAL DIMETHYL-HYDRAZINE

Richard C. Harshman, Kenmore, N. Y., assignor to Olin Mathieson Chemical Corporation, a corporation of Virginia No Drawing. Application February 4, 1955
Serial No. 486,273

2 Claims. (Cl. 260—19)

This invention relates to improved agents for addition to film-forming protective coating mixtures to prevent the formation of films in storage but permitting such formation when applied to solid surfaces. More particularly, this invention relates to improvements in addition agents for the prevention of skin formation in these compositions when stored, without unduly interfering with their normal film-forming tendencies in use. The invention is useful for paints, varnishes, enamels and other compositions which dry by reaction with atmospheric oxygen.

Most paints and varnishes comprise mixtures of several components including drying oils, diluents, pigments and drying aids. It is important in the use of these materials that the composition when spread on a surface to be protected shall dry tack-free as quickly as possible. It is also important to avoid the formation of a film or skin in the can before the composition is put into use. These two requirements appear to be incompatible, particularly for compositions which dry by reaction with oxygen in the air. A material which shortens drying time, for example, lead, cobalt or manganese naphthenate or oleate, will also shorten the time required for the formation of a skin in a partly filled can. Materials added to such compositions for the purpose of preventing skin formation in storage usually act as inhibitors for oxygen absorption and lengthen drying time by the same mechanism that they delay skin formation.

Hydrazine is an example of a material which has been added to paints and is very effective in small concentration in preventing skin formation. However, it may extend the drying time as much as ten-fold. Thus hydrazine is not a satisfactory addition agent for paints and varnishes. A few materials are known which appear to delay skin formation to a degree without seriously extending the drying time, for example, methylethylketoxime and butyraldoxime. But additional compounds meeting the peculiar requirements for these compositions are greatly to be desired.

Improved results are obtained according to the present invention by the incorporating of minor proportions, suitably from about 0.05 percent to 0.5 percent by weight of unsymmetrical dimethylhydrazine, $(CH_3)_2NNH_2$, into film-forming compositions which dry by reaction with atmospheric oxygen. Lesser proportions are generally insufficient to prevent skin formation in most compositions of the type described and more may interfere excessively with drying of the compositions in use. The particular amount to be used varies with the composition and drying time of the uninhibited material. Compositions which dry very rapidly generally require larger proportions within the recited range and compositions which dry less rapidly generally require smaller proportions within the recited range.

Example I

A portion of a commercial phenolic-tung oil varnish containing no anti-skinning agent was placed in a two ounce jar, exposed for 30 minutes to the air, tightly capped and allowed to stand overnight. Another portion of the same varnish to which was added 0.4 percent by volume unsymmetrical dimethylhydrazine was treated in the same way. A third sample was similarly prepared using the same varnish to which was added 0.4 percent by volume of butyraldoxime, a commercially available antiskinning agent. After standing overnight, the untreated spar varnish was covered with a heavy skin whereas the composition containing the dimethylhydrazine was not skinned. The composition containing butyraldoxime was gelled and covered with a light skin.

Example II

A commercial phenolic-tung oil varnish was placed in a two ounce jar, exposed for 30 minutes to the air, loosely capped and allowed to stand. Another portion of the same varnish was treated with 0.1 percent by weight of unsymmetrical dimethylhydrazine, added as a 10 percent solution in mineral spirits. The treated sample was exposed the same as the blank. No skin formed on the sample containing the dimethylhydrazine until after about 41 hours, whereas the untreated sample showed a skin after 17 hours.

Example III

Another phenolic-tung oil varnish was used for determining the drying time of samples containing unsymmetrical dimethylhydrazine. The varnish was applied to glass in a uniform thin film and found to dry tack-free in about 40 minutes. A sample of the same varnish to which had been added 0.1 percent by weight of the dimethylhydrazine in the form of a ten percent solution in mineral spirits was similarly exposed. Its drying time was 80 minutes. This is still a very fast drying varnish which in ordinary storage and use will not skin noticeably in the can.

The film forming composition of the present invention can be prepared using any of the usual drying or semi-drying oils, such as tung oil, linseed oil, dehydrated castor oil, soya bean oil, oiticica oil, sunflower oil, perilla oil, cashew nut oil, and so forth, either raw, blown, heat boiled or otherwise conventionally modified. In addition, the film-forming composition can be prepared using the esters of the acids derived from the drying or semi-drying oils and polyhydric alcohols, such as glycerol, ethylene glycol, pentaerythritol, dipentaerythritol, sorbitol, mannitol, erythritol, and so forth. The film-forming composition, if desired, can also be prepared using the pure esters of the drying or semi-drying oil fatty acids, such as linoleic acid, oleic acid, linolenic acid, ricinoleic acid, eleostearic acid, and so forth, and polyhydric alcohols such as ethylene glycol, glycerol, pentaerythritol, dipentaerythritol, sorbitol, mannitol, erythritol and so forth. As the examples illustrate, the film-forming composition can also be prepared from the drying or semi-drying oil modified resins which are customarily used in the art, such as the modified alkyd resins prepared, for example, by the esterification of glycerol, phthalic anhydride and drying or semi-drying oil fatty acids; the modified phenolic resins prepared, for example, by the reaction of cresols, formaldehyde and the drying or semi-drying oils; the modified esters of rosin or modified (hydrogenated, isomerized, polymerized, and so forth) rosins prepared for example, by the esterification of rosin, glycerol, or pentaerythritol, and the drying or semi-drying oil fatty acids.

The film-forming composition of the present invention can also, if desired, include the usual pigments (e. g. titanium dioxide, calcium sulfate, zinc oxide, carbon black, chrome green, iron oxide and so forth), resins (e. g.

para-tertiary butyl or amyl phenol-formaldehyde, urea-formaldehyde, rosin, copal, kauri, congo, manila, dammar, and so forth), solvents (e. g. butyl alcohol, toluene, xylene, turpentine, and so forth), thinners such as mineral spirits and driers (e. g. lead, cobalt or manganese naphthenate, oleate or octoate).

I claim:

1. An air drying liquid film-forming composition containing esters of unsaturated fatty glyceride oil acids which dries by reaction with atmospheric oxygen when applied to a surface, said composition containing from 0.05 to 0.5 percent by weight unsymmetrical dimethylhydrazine.

2. A composition according to claim 1 in which said composition is a phenolic-tung oil varnish.

References Cited in the file of this patent

UNITED STATES PATENTS 1,793,635    Reed _____ Feb. 24, 1931

FOREIGN PATENTS 452,536    Great Britain _____ Aug. 25, 1936